United States Patent [19]
Marvel

[11] 3,877,043
[45] Apr. 8, 1975

[54] MULTIPLE IMAGE PHOTOGRAPHIC CAMERA
[76] Inventor: Fred D. Marvel, 1417 E. Second St., Tulsa, Okla. 74104
[22] Filed: Sept. 24, 1973
[21] Appl. No.: 398,993

Related U.S. Application Data
[63] Continuation of Ser. No. 225,836, Feb. 14, 1972, abandoned.

[52] U.S. Cl. .............................................. 354/123
[51] Int. Cl. .......................................... G03b 19/02
[58] Field of Search ........... 95/36, 37; 354/123, 124

[56] References Cited
UNITED STATES PATENTS
2,335,697   11/1943   Reyniers .............................. 354/123

Primary Examiner—John M. Horan
Attorney, Agent, or Firm—Charles S. Holmes

[57] ABSTRACT
Disclosed herein is a multiple imagery photograph camera which provides a means for placing multiple displays or pictures upon a single photograph print for utilization, in particular, with embossing machinery in order to manufacture photographic identification cards.

2 Claims, 3 Drawing Figures

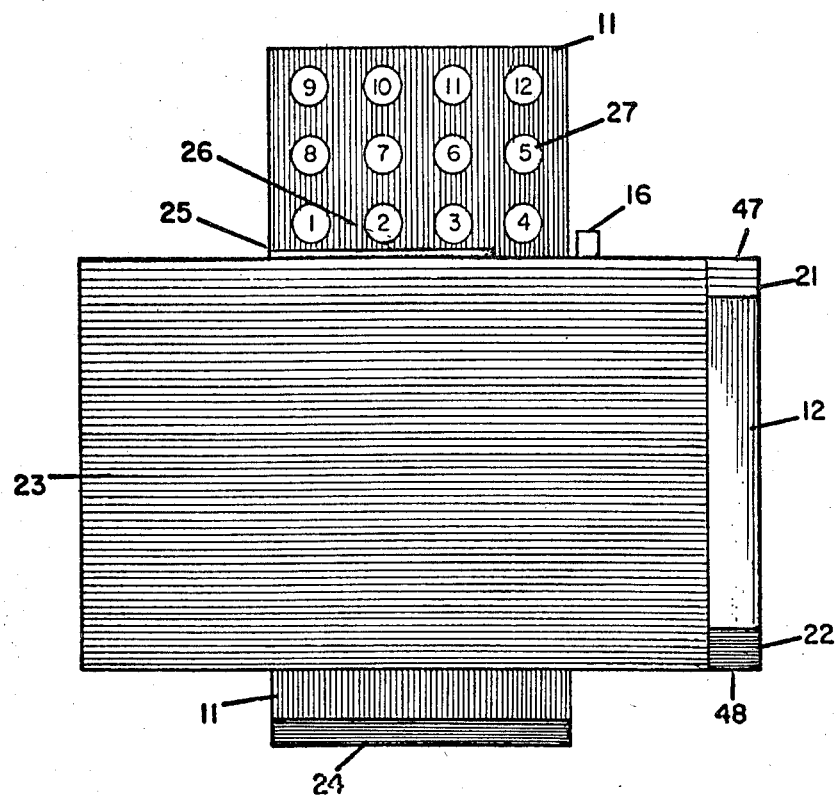

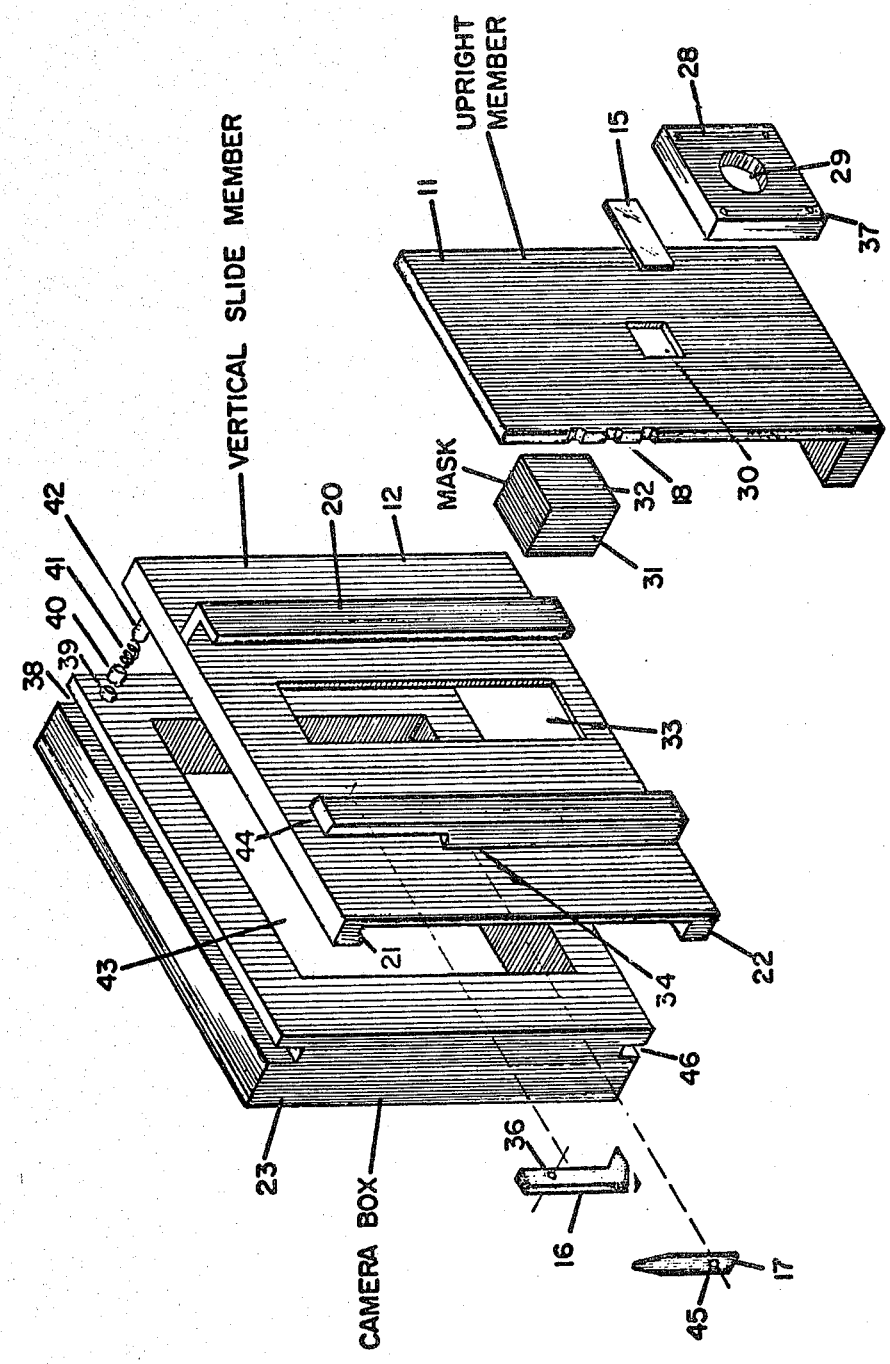

MULTIPLE IMAGE PHOTOGRAPHIC CAMERA

BACKGROUND OF THE INVENTION

This application is a continuation of my provisions application, Ser. No. 225,836, filed Feb. 14, 1972, now abandoned.

The present invention relates to multiple imagery photograph cameras. More particularly, the present invention provides a means for placeing multiple displays or pictures thereon a single photograph print for particular utilization with an embossing machine for photograph identification card production.

The increased utilization of photo identification cards for both credit identification and for employment identification has brought about the particular requirement that multiple imagery photography be developed in order that more than a single image may be projected thereon a photograph print. Multiple imagery photographs are required in order to provide an economic means for manufacturing large numbers of photographs rapidly, and in the particular size required for utilization with photograph identification cards.

Conventional apparatus utilized to provide multiple imagery photography upon a photograph print include multiple lens arrangements, for example, quadruple focus lenses having four focus lenses mounted about a lens and shutter assembly so that the lens may be rotated in order to expose various portions of a photograph sensitive paper to light. This lens arrangement allows four photographic images to be placed on one photograph print. Still another conventional method for placing multiple imagery upon a single photographic print includes the utilization of a prism having a motor associated therewith in order to rotate the prism and allow three or four images to be exposed to a single photographic sensitive paper. Photographic masks have also been placed upon the photographic sensitive paper and moved across the photographic sensitive paper in order to provide a means for exposing specific areas of the photographic sensitive paper to light imagery in order to provide multiple imagery imprints upon the photographic print.

Each of the conventional apparatus which have been disclosed and discussed herein exhibit the same inherent inadeptness for utilization for photograph identification card usage in that rapid focus of the imagery upon the photosensitive paper is not allowed. The movement of a prism, lens or mask across the photographic sensitive paper requires continual refocusing of the lens in order to gain exact focus of the imagery upon the photographic sensitive paper. A further restriction, which is inherent with the multiple-imagery display photographic systems available for photographic identification card usage, is that the photographic image developed does not have an exact or distinct outline about the image formed upon the photographic sensitive paper, nor may it normally be exactly sized to the square or rectangular shape required for the identification card. Therefore, conventional photographs require a machine cutter, generally being comprised of a lower edge cutter and a masking board associated with the embossing apparatus in order to allow for imagery cutout of the photographic print to the size and shape of the photograph formed of the sharp edges required for the identification card.

What is required is apparatus which provides for multiple imagery display upon photographic sensitive paper of several or more images, each image having a distinct outline and being formed of the size required for the particular photograph identification card usage.

It is an object of the present invention to provide apparatus for multiple imagery display upon photographic sensitive paper.

It is further object of the present invention to provide apparatus for the multiple display of imagery in distinct sizes and shapes upon photographic sensitive paper.

It is still a further object of the present invention to provide apparatus which allows photographs, having particular size and form, for utilization with photograph identification cards, said images to be provided with distinct outlines between each photograph image as displayed upon the single photographic print in order to allow manual and unaligned separation of the photographs from one another and direct positioning thereupon the photograph identification card for embossing and immediate use.

With these and other objects in mind, the present invention may be more readily understood through referral to the accompanying drawings and following discussion:

SUMMARY OF THE INVENTION

The objects of the present invention are most readily achieved through utilization of apparatus for forming multiple images upon a photographic print. The apparatus may comprise a camera box having an opening in one of the sides and means for passing a photographic sensitive paper or film across the camera box so as to expose the film to the opening. A face plate is supplied being slidably mounted to the open side of said camera box and being affixed so as to completely cover said opening. A mask, having the dimensions of the photographic image desired upon the photographic print, is mounted upon the face plate, said face place having a hole the size of the mask. Said mask directing the light which passes through the hole in the face plate upon the photographic film. A lens and shutter assembly is positioned upon the opposing side of the face plate from the mask, about the hole in the face plate and means for positioning the camera box about the face plate. Means to systematically expose each of the areas of the photographic film to the mask are further provided.

In general, within the apparatus of the present invention, the face plate may comprise an upright member having the mask, and lens and shutter assembly mounted upon and containing a hole through which light may be passed. A vertical slide member, the ends of which are channelled to envelope the sides of the upright member, is provided to allow the vertical slide member to slide up and down the upright member. The vertical slide member having a hole through which the mask is passed, the camera box being slidably mounted thereon the vertical slide member so as to provide horizontal movement to the camera box, in addition to the vertical movement provided by mounting upon the upright member. The apparatus of the present invention may have the camera box slidably mounted upon the vertical slide member by the vertical slide member having a channelled upper and lower edge, the camera box being enclosed within the channels of the vertical slide member.

It is preferred that the means for positioning the camera box about the face plate so as to systematically expose each of the areas of the photographic film to the mask comprise one or more spring loaded stops positioned within holes machined in the exterior surface of the camera box in conjunction with races, machined in the opposing surface of the vertical slide member at the position at which the camera box is desired to be systematically exposed to the photographic film through the mask. The spring stops afford horizontal restriction to the movement of the camera box about the mask. One or more slots are machined in the sides of the upright member, and positioned so as to place the camera box at the desired heights to systematically expose the photographic film to the mask. A grove guide is attached to the vertical slide member so that said grove guide rests in the respective slots of the upright member as the vertical slide member is advanced up and down the upright member providing the vertical restriction of the movement of the camera box about the mask. The apparatus may further comprise means for aligning the camera lens which may take the preferred embodiment of a mirror mounted upon the mounting plate for the lens and shutter assembly, said mirror being angled so that when the object to be photographed is viewed within the mirror, the camera lens is aligned.

BRIEF DESCRIPTION OF THE DRAWINGS

The objects of the present invention may be more readily understood through referral to the accompanying drawings, in which:

FIG. 2 represents a rear view of one embodiment of the apparatus of the present invention for forming multiple images upon a photographic print and showing the capability of twelve positionings of a photographic image upon a photographic print; and FIG. 3 represents an exploded view of one embodiment of the apparatus of the present invention for forming multiple images upon a photographic print, depicting the exact disposition of the various members comprising the apparatus.

DETAILED DESCRIPTION OF THE INVENTION

Figure 1:
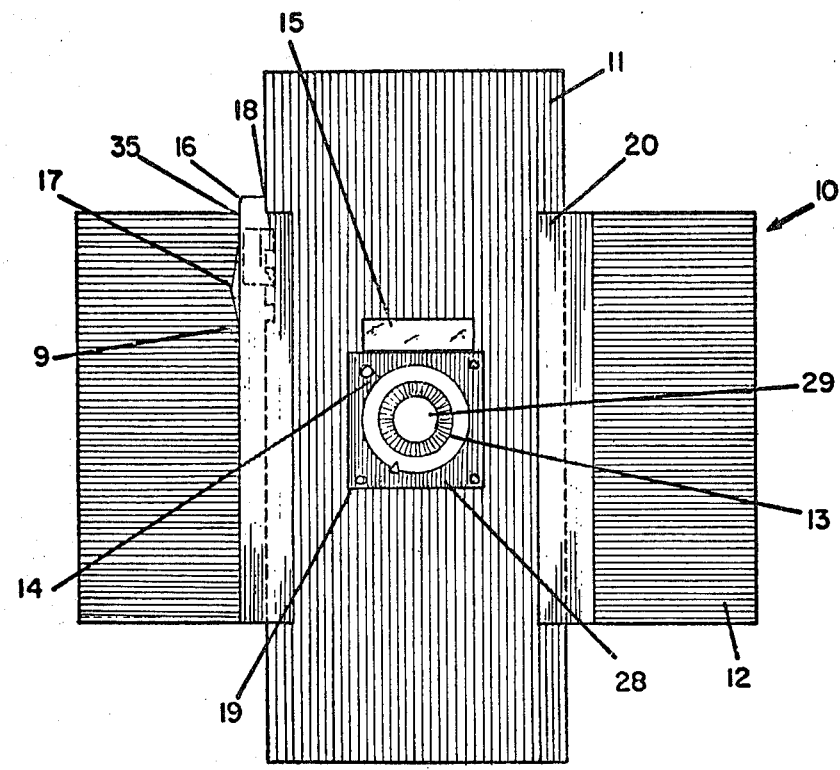
FIG. 1 represents a front view of one embodiment of the apparatus of the present invention for forming multiple images upon a photographic print.

In general, the apparatus of the present invention comprises a camera having the ability of forming multiple images upon a photographic print. The camera includes a conventional lens and shutter assembly and a camera box having film advancement apparatus. The apparatus exhibiting a focusing ability for multiple image photography with the appropriate distance between the lens and photographic print or photographic sensitive paper so as to allow the appropriate sized image to be formed within the camera box. The apparatus for forming multiple images upon a photographic print, however, is considerably different from conventional cameras available for photo imagery reproduction. In particular, one embodiment of the apparatus of the present invention may be more readily depicted through referral to the accompanying figures.

Specifically, in FIG. 1 a front view of an embodiment of the apparatus for forming multiple images upon a photographic print is depicted. Camera 10 is illustrated as providing a face plate slidably mounted to a camera box not depicted in FIG. 1. The face plate comprises an upright member 11 having a lens 13 and shutter assembly 14 contained upon a mounting plate 28. The mounting plate 28 is securely affixed to the upright member 11 by passing one or more mounting screws 19 through the mounting plate 28. A lens 13 having an aperture 29 through which light is passed within the camera assembly 10. The upright member is slidably attached to a vertical slide member 12, the ends of which are channelled 20 to envelope the sides of the upright member 11. Channels 20 allow the vertical slide member 12 to traverse vertically upon the upright member 11. A hole is provided in the vertical slide member 12 through which light may pass into the camera box.

Further depicted in FIG. 1 is a means for positioning the camera box about the face plate as to systematically expose each of the areas of photographic film to the mask. The means for vertically positioning the camera box about the face plate, through movement of the vertical slide member 12 vertically along the upright member 11, may comprise one or more slots or indentations 18 machined in the side of the upright member 11 and being positioned so as to place the camera box attached to the vertical slide member 12, at the desired height to systematically expose the photographic film to the mask. A groove guide 16 is attached to the vertical slide member 12 into the groove guide 16. Said groove guide 16 rests in the respective indentations 18 of the upright member 11 through pressuring by spring 17 having a screw 35 passed through one end of spring 17 into the channel 20 of the vertical slide member 12. The groove guide 16 allows the vertical slide member 12 to be advanced vertically up and down the upright member 11 through movement of the groove guide 16 through indentation 18 contained within the upright member 11.

The interaction of the various components of the apparatus of the present invention may be more readily depicted by referral to FIG. 2 in which a rear view of the apparatus of the present invention is depicted. In particular, the camera box 23 is first seen being slidably mounted so as to horizontally position itself along channels 21 and 22 of vertical slide member 12. Vertical slide member 12 is vertically adapted to the upright member 11, having a mounting plate 24 for mounting upon a tripod or other photographic equipment. The groove guide 16 is shown with its positioning adjacent the upright member 11, with the upright member 11 having a sequence of numbered positions one through twelve 27 depicting the sequential positioning of the camera box 24 as it is horizontally traversed across the channels 21 and 22 of vertical slide member 12, and vertically advanced upward, through release of groove guide 16, across the upright member 11. A guide indicator 26 is mounted upon the top of the camera box 23 having an indice 26 which depicts the positioning of the camera box 23 as it sequentially moves through the various positions 17 of the vertical slide member 12 and upright member 11.

The exact construction of one embodiment of the present invention may be more readily understood by referral to FIG. 3 in which an exploded view of an embodiment of the apparatus of the present invention is depicted. Through the exploded view of the apparatus of the present invention, the face plate is shown to be comprised of two members, the first upright member 11 having a hole 30 and having mounted upon a mounting plate 28 having a hole 29 also aligned with hole 30 of the upright member 11 and being firmly affixed to upright member 11 by passing one or more screws through mounting screw holes 37. A mirror 15 is positioned above the mounting plate 28, upon which the lens and shutter assembly is adapted, as already disclosed in FIG. 1 in order that the lens and shutter assembly may be aligned so that when the object to be photographed is viewed in the mirror the camera lens is aligned with the object through exact angling of the mirror as mounted against the upright member 11.

The member which forms the image producing means is depicted as mask 31 having aperture 32 which is readily mounted upon the interior surface of the upright member 11. Aligned with the mask 31 is a hole 30 contained within upright member 11, the mask being sized so as to form the appropriate number of photographic images on a photoprint, for example in the twelve-sequenced photographic imagery camera 10 as shown in FIGS. 1 through 3, the mask would be sized so that exactly twelve times the circumferential surface area of the hole 32 contained within the mask 31 would exactly be contained within the size of one photoprint. Mask 31 is slidably mounted within a hole 33 having a greater vertical dimension then horizontal dimension as contained within the vertical slide member 12 such that as the vertical slide member moves up and down the upright member 11 the mask 31 slidably moves within the elongated hole 33 of the vertical member 12. As disclosed, the vertical member 12 being shown is attached to the upright member 11 by means of two or more channels 20 contained thereon the exterior surface of the upright member 12 so as to receive therein the side of the upright member. The means for positioning the camera box about the face plate, so as to systematically expose each of the areas of photographic film to the mask 31 in the vertical direction and movement of the camera box 23, being provided through one or more slots or indentations 18 machined in the side of the upright member 11. The vertical slide member 12 being positioned so as to place the camera box 23 at the desired height so as to systematically expose the photographic film to the mask 31 through the movement of the groove guide 16 readily mounted upon one of the channels 20. The groove guide 16 is mounted through a mounting hole 44 in channel 20 and a hole 36 in groove guide 16 and a screw passed through said hole 36, said screw not being depicted in the present FIG. 3. Said groove guide 36 normally rests in respective slots or indentations 18 of the upright member 11 as vertical slide member 12 is advanced up and down the upright member 11. A spring 17 is further provided having a hole 45 which is aligned with the hole 34 contained within the channel 20 through passage of a screw within the hole 34 in order to place tension upon the groove guide 16 and rest the groove guide 16 normally in an inserted position within one of the indentations 18 of the upright member 11.

The horizontal alignment of the camera box 23 may be readily depicted through camera box 23 having an upright groove 38 horizontally aligned therein the camera box 23, and a lower groove 46 horizontally aligned in the camera box 23. The upper and lower grooves 38 and 46, respectively, being drawn through the respective channels 21 and 22 of the vertical slide member 12 so that the camera box 23 may be horizontally aligned and moved across the vertial slide member 12. The camera box 23 is provided having the photographic print enclosure 43 with a respective hole to allow the mask 21 to be moved vertically through the hole 43 and horizontally across the hole 43 with respective vertical movement of the vertical slide member 12 and horizontal movement of the camera box 23.

The means for positioning the camera box about the face plate, so as to photographically expose each of the areas of the photograhic film in a horizontal direction, may be provided by one or more spring loaded stops 46 being associated with a spring 41 and spacer 40 as positioned within one or more holes 39 contained within the base of the camera box 23. Respective races are contained within the rear of the channels 21 and 22, more readily depicted in FIG. 2 are races 47 and 48, in which the one or more spring loaded stops 42 may rest. Therefore, the camera box may be horizontally positioned about the vertical slide member 12 by placing pressure upon the side to which the direction of the camera box is desired in order to systematically expose the photographic film contained within hole 43 of the camera box 23 at the respective positioning of the races contained thereon the vertical slide member 12.

In the embodiment of the camera box depicted in the present invention, the camera box would readily include a door enclosure to seal the rear portion of the hole 43 and allow the advancement of film. This apparatus may be provided, for example, through a film advancement mechanism comprising a roller and stop assembly as activated by an external knob on the camera box. This apparatus being conventionally utilized for any camera assembly are not disclosed or further discussed herein with it being recognized that various and sundry conventional means of film advancement mechanisms are available in order to expose the photographic sensitive paper. This apparatus is provided in conjunction with the lens and shutter assembly for allowing the passage of the light image through the mask 31 through the exact systematic positioning of the vertical slide member 12 across the upright member 11 and the camera box 23 horizontally aligned with the vertical slide member 12 in order to gain the multiple imagery photography by the apparatus of the present invention.

In addition, the materials of construction of the present invention are preferably metallic or plastic in nature, although various known materials of construction for photographic equipment may be utilized or combinations thereof in order to provide the apparatus as disclosed herein. It being readily understood that durable materials, having particular characteristics required for the various applications, are desired.

Therefore, through utilization of the apparatus of the present invention as disclosed and described herein, one is provided with apparatus which affords multiple positioning of a camera box about a face plate so as to systematically expose each and every area of the photographic film and allow multiple imagery exposure. The apparatus is particularly adaptable for usage with photographic identification cards or other identification systems wherein multiple imagery is required for economic and efficient recovery and for utilization to achieve photographic prints normally of smaller size than that allowed from conventional rapid processing cameras. The multiple imagery yields to the operator a single photographic print not requiring mask cutting but already having readily identified outlines of distinct image prints so as to allow for easy separation of the prints and mounting upon the photographic identification cards for subsequent embossing.

The present invention has been described herein with reference to particular embodiments thereof. It will be appreciated, however, by those skilled in the art, that various changes and modifications may be made without departing from the scope of the invention as set forth herein.

Therefore, I claim:

1. Apparatus for forming multiple imagery on a photographic print for utilization on photographic identification cards, which comprises:
   a. a camera box having an exterior surface through which an opening is provided, and further having one or more holes in the exterior surface of the camera box containing the opening, and further having upper and lower grooves provided across the top and bottom respectively of the camera box;
   b. means for passing a photosensitive film across the interior of the camera box so as to expose the film to the opening in the exterior surface of the camera box;
   c. a vertical slide member, the top and bottom of which are channeled to envelop the upper and lower grooves of the camera box, having a hole within the surface of the vertical slide member in direct alignment with the opening in said camera box, the camera box being slideably mounted upon the vertical slide member so as to provide horizontal movement to the camera box, and comprising two channels positioned in parallel and contained upon the surface of the vertical slide member opposite the camera box, and further comprising one or more races contained on the top and bottom surface of the insides of the channels of the vertical slide member facing the camera box and being located along the channels in positions to align with the holes reamed in the exterior surface of the camera box;
   d. an upright member, the sides of which are the width of the grooves of the parallelled channels of the vertical slide member, slideably mounted to the camera box by being passed through the channels, said channels allowing the vertical side member to slide up and down the upright member, having an opening, said opening being sized so as to align with the opening contained in the side of the camera box and having one or more slots cut in one of the vertical sides;
   e. one or more spring loaded stops positioned within the holes contained within the exterior surface of the camera box to act in conjunction with the races contained within the inside surfaces of the top and bottom channels of the vertical slide member to allow the camera box to be positioned horizontally as dessired to systematically expose the photographic film;
   f. a groove guide attached to the vertical slide member so that said groove guide rests in the respective slots of the upright member as the vertical slide member is advanced up and down the upright member;
   g. a mask, having the dimensions of the photographic image desired upon the photographic print, being mounted upon the side of the vertical upright member exposed to the camera box at the opening and having a hole in the sides of the mask, said mask directing light which passes through the hole in the upright member upon the photographic film;
   h. a lens and shutter assembly positioned on the opposing side of the upright member and vertical slide member from the mask about the openings in the upright member and vertical slide member;
   i. means or aligning the camera lens; and
   j. a spring mounted upon the channel of the vertical slide member and having a screw passed through the vertical slide in order to tension upon the groove and rest the groove guide normally in an inserted position within one of the slots of the upright member.

2. The apparatus of claim 1 in which:
   a. the camera box contains four equally spaced holes reamed in the upper and lower exterior surface about the opening, spaced from side to side upon the camera box;
   b. the vertical slide member contains four equally spaced races along the channels in positions to align with the holes reamed in the exterior surface of the camera box;
   c. four spring loaded stops positioned within each of the holes of the camera box; and
   d. the upright member has three slots contained in one side, with the arrangement of the spring loaded stops contained within the holes of the camera box to be maneuvered into four horizontal positions and the three slots contained in the upright member in conjunction with the groove guides allowing three vertical positions to be obtained by the camera box, so that a total of twelve positions may be obtained with the camera box to produce twelve images cast upon a single photograph print.

* * * * *